Aug. 26, 1958     W. M. KOLLENBERGER     2,848,971
DEVICES FOR DAMPING THE ROLLING MOVEMENT OF SHIPS
Filed Oct. 11, 1955     2 Sheets-Sheet 1
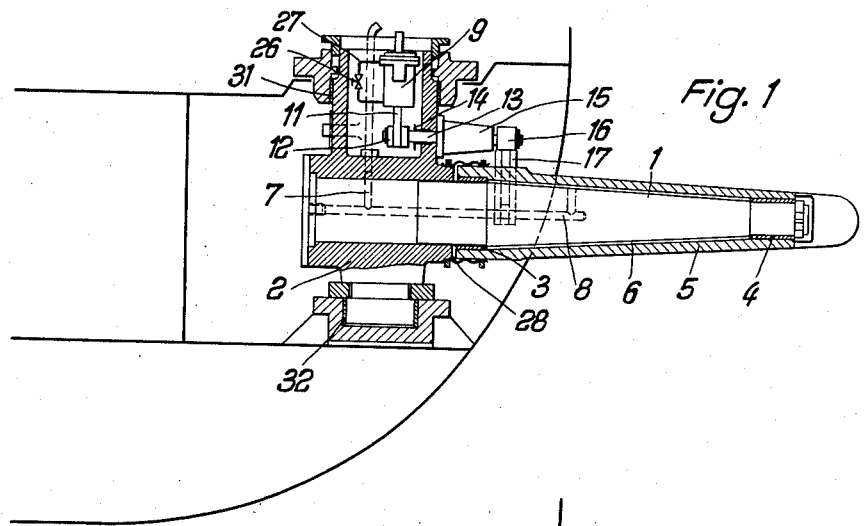
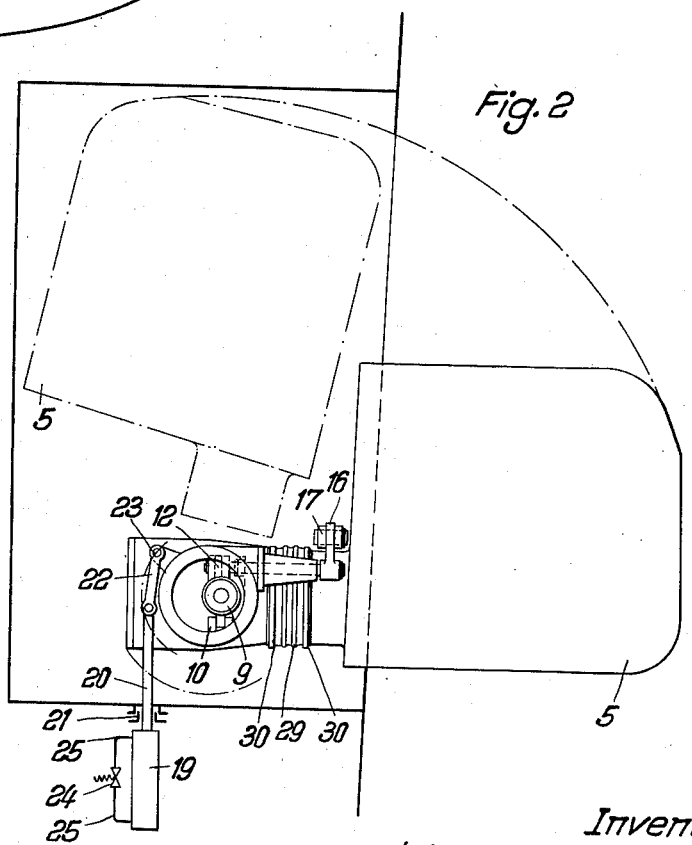
Inventor:
Walter M. Kollenberger
By Stevens, Davis, Miller and Mosher
ATTORNEYS Aug. 26, 1958  W. M. KOLLENBERGER  2,848,971
DEVICES FOR DAMPING THE ROLLING MOVEMENT OF SHIPS
Filed Oct. 11, 1955  2 Sheets-Sheet 2

Inventor.
Walter M. Kollenberger
By Stevens, Davis, Miller and Mosher
ATTORNEYS

United States Patent Office 2,848,971
Patented Aug. 26, 1958

2,848,971

DEVICES FOR DAMPING THE ROLLING MOVEMENT OF SHIPS

Walter Michael Kollenberger, Hamburg-Othmarschen, Germany

Application October 11, 1955, Serial No. 539,796

Claims priority, application Germany August 1, 1955

9 Claims. (Cl. 114—126)

In devices for damping the rolling motion of ships, which devices are furnished with stabilising surfaces of sectional form, the stabilising surfaces are arranged in fixed, sliding or pivotally connected fashion on both sides of a ship's hull. In such installations the stabilising surfaces are mounted on shafts which may be moved in angular fashion mechanically, hydraulically or in other manner dependent on the nature of the drive.

Particular disadvantages in association with devices of this character reside in the extremely heavy loads imposed on the bearings of the stabiliser shafts and particularly in the case of sliding arrangements, the difficulty of adequately lubricating the outer shaft bearing, which is slidable into the accommodating chamber in common with the stabiliser shaft, in order that this bearing will not be rendered useless after merely a brief period of operation, which might lead to serious damage to the complete installation.

In known embodiments the large dimensions of the outer bearing of the stabiliser shaft do not enable this bearing to be moved sufficiently close to the ship's side, and accordingly the distance of the bearing from the point at which the bending forces exerted on the stabilising surface take effect to be reduced and the bending strain on the stabiliser shaft to be made as small as possible.

It is the main object of the present invention to reduce the pressures occurring at the stabiliser shaft bearings.

It is a further object of the invention to ensure proper lubrication of the bearings.

The invention furthermore has for its object by means of a novel construction of the stabiliser shaft, better to take over the forces exerted on the shaft, or to reduce the bending moments by displacement of the supporting point up to the ship's wall.

In order that the invention may be more readily understood an embodiment thereof is illustrated, by way of example, as applied to a damping device of the kind described in which the stablising surfaces may be rocked in a horizontal plane.

Fig. 1 shows a vertical longitudinal section through a damping device with a stabilising surface swung into the operative position.

Fig. 2 shows the damping device according to Fig. 1 viewed from above.

Figure 3:
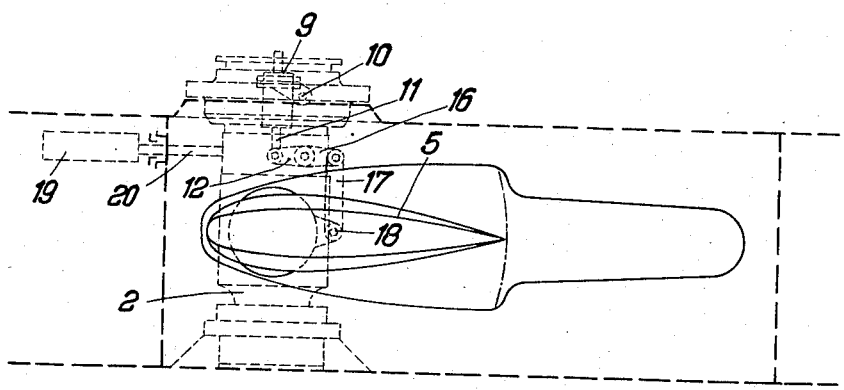
Fig. 3 is a view of the damping device, including the stabiliser chamber, looking towards the ship.

In a device according to the invention for damping the rolling motion of ships a stabiliser shaft 1 is securely fitted with its inner end in a swivel support 2 rotatably mounted in bearings 31 and 32, or it forms together with this support a common structural unit, whilst the free end of the shaft 1 is furnished with bearing points 3 and 4, about which a stabilising surface placed over the same is capable of performing angular movement.

For the purpose of ensuring an adequate forced lubrication of the points 3 and 4 there is formed about the stabiliser shaft 1, between the two bearings, when the stabilising surface 5 is fitted in position a lubricant reception space 6, which is fed by an elevated container located within the hull of the ship or by means of an oil pressure pump or the like through passages 7 in the support 2 and passages 8 in the shaft 1.

According to the embodiment illustrated in the drawing the adjustment of the stabilising surface is effected hydraulically, although in accordance with another embodiment it may also be performed mechanically or pneumatically.

In the hydraulic arrangement there is provided in the upper hollow portion of the swivel support 2 a cylinder 9, which is pivotally connected to the support 2 by means of a bifurcated bearing 10. The setting movement in respect of the stabilising surface 5 is transmitted by way of a plunger having a rod 11 to a lever arm 12, which is rigidly connected to a shaft 13. This shaft 13 is conducted by way of a stuffing box 14 and a bearing 15 outwardly through the wall of the support 2 into the stabiliser chamber. On the other end of the shaft 13 there is secured a lever arm 16, which by way of a link 17 and a joint 18 is connected to the stabilising surface 5 and thus transmits to the stabilising surface the movements of the plunger 11.

In the event of failure on the part of the oil pump in respect of the setting of the stabilising surface 5 a compensation of the pressure in the setting cylinder 9 may be brought about by opening a valve 26 in a line 27 connecting the two ends of the cylinder, so that the stabilising surface returns to the zero position under the pressure exerted on its surface in consequence of the rate of movement of the ship.

According to the invention hydraulic driving means are likewise provided for swinging the stabilising surface 5 into the operative position or into the position of rest.

In a cylinder 19 located in the interior of the ship's hull there is moved a plunger having a rod 20 which projects into the stabiliser chamber, the passage through the wall of the chamber being sealed by means of a stuffing box 21. In this connection the rod 20 is connected to an articulated lever 22 coupled with a bearing member 23 secured to the swivel support 2.

To avoid damage to the stabiliser shaft, caused by blows or knocks against the stabilising surface in the direction of flow of water, there is provided in conjunction with the cylinder 19 a safety valve 24 located in a pipe 25, which connects the two ends of the cylinder.

In the event of a sudden increase in pressure caused by a blow against the leading edge of the stabilising surface the valve 24 opens for a brief space of time and the stabilising surface is able to yield in the direction of the stabiliser chamber until compensation of the pressure has been achieved.

If upon lack of oil pressure in the cylinder 19 the safety valve 24 is opened by hand, the stabilising surface 5, owing to the flow resistance brought about by the rate of movement of the ship, is swung into the stabiliser chamber automatically.

According to the invention, the annular gap 28 formed between the swivel support block and the stabilishing surface 5 by the application of the stabilising surface to the shaft 1 is sealed by means of a packing material 29, which is placed about the gap in the manner of a muff and is pressed by means of split rings 30 into annular grooves provided for this purpose in the swivel support block and in the boss of the stabilising surface. The construction may also be such that the lever mechanism in respect of the swivel support is located wholly in the interior of the ship, i. e., without any connections being passed out into the stabiliser chamber. This may be effected, for example, by extending the swivel support upwardly or downwardly, the rocking means therefor engaging with such extension.

I claim:

1. A device for use with a ship for damping the rolling motion of a ship comprising a stabilising surface adapted to be located laterally in the operative position on each side of a ship's hull below the water line, a stabiliser shaft connected with each of said stabilising surfaces, means mounting said stabilising surfaces for angular movement on said shafts, each shaft having bearing means to be lubricated, a stabiliser chamber adapted to be located in the ship's hull to accommodate each stabilising surface in the inoperative position thereof, and a swivel support for each of the stabiliser shafts about which each stabilising surface may be swung into and out of its associated chamber, each stabiliser shaft being rigidly associated with said swivel supports at its inner end.

2. In a device for damping the rolling motion of ships, a stabilising surface adapted to be located on each side of a ship's hull extend laterally therefrom in the operative position below the water line, a stabiliser shaft in association with each stabilising surface, lubricated bearings on the ends of each stabilising shaft, each of said shafts being tapered conically outwards between the bearings and each stabilising surface being mounted on said bearings to be capable of angular movement on said shaft, a stabiliser chamber adapted to be provided on each side of the ship's hull to accommodate each stabilising surface in the inoperative position thereof, and a swivel support for each stabiliser shaft about which the stabilising surface may be swung into and out of its chamber, each of said stabiliser shafts being rigidly associated with the switvel supports at its inner end.

3. In a device for damping the rolling motion of ships, a stabilising surface adapted to be located on each side of a ship's hull below the water line, a stabiliser shaft in association with each stabilising surface, lubricated bearings on the ends of each stabiliser shaft, each of said stabilising surfaces being mounted on the bearings to be capable of angular movement on the shafts and in spaced relation thereto to form in co-operation with each shaft a lubricant accommodating space between the bearings, a stabiliser chamber adapted to be provided on each side of the ship's hull to accommodate each stabilising surface in the inoperative position thereof, and a swivel support for each stabiliser shaft about which the stabilising surface may be swung into and out of the chamber, its stabiliser shaft being rigidly associated with its swivel support at its inner end.

4. In a device for damping the rolling motion of ships, stabilising surfaces adapted to be located on both sides of a ship's hull to extend laterally therefrom in the operative position below the water line, a stabiliser shaft in association with each stabilising surface and having a lubricant-supply passage extending therethrough, lubricated bearings on the ends of each stabiliser shaft, stabilising surfaces being mounted on the said bearings for angular movement on the shafts and disposed by the bearings in spaced relation to the shafts to form in co-operation wtih said shafts a lubricant-accommodating space between the said bearings, the hull of a ship having a chamber to accommodate each stabilising surface in the inoperative inward position thereof, a swivel support for each stabiliser shaft and having a lubricant-supply passage extending therethrough in communication with said first passage and about which its stabilising surface may be swung into and out of its chamber, each of said stabiliser shafts being rigidly associated with a swivel support at its inner end, and means for supplying lubricant through said passages to said spaces between said stabiliser shafts and said stabilising surfaces.

5. In a device for damping the rolling motion of ships, stabilising surfaces adapted to be located on both sides of a ship's hull below the water line, a stabiliser shaft in association with each stabilising surface, the stabilizing surfaces being mounted on the shafts for angular movement relative thereto, lubricated bearings on each shaft, means for angularly moving the stabilising surfaces for imparting the requisite angular setting to said stabilising surfaces, a stabiliser chamber in the ship's hull to accommodate each stabilising surface in the inoperative inward position thereof, and a swivel support for each stabiliser shaft about which the stabilising surface may be swung into and out of its chamber, the stabiliser shafts being rigidly associated with the swivel supports at their inner ends.

6. In a device for damping the rolling motion of ships, stabilising surfaces adapted to be located on both sides of a ship's hull below the water line, a stabiliser shaft in association with each stabilising surface, each stabilising surface being mounted to be capable of angular movement on its shaft, lubricated bearing means on each shaft, a stabiliser chamber in the ship's hull to accommodate each stabilising surface in the inoperative position thereof, a swivel support for each stabiliser shaft, each stabiliser shaft being rigidly associated with its swivel support at its inner end, means extending through the swivel supports to the exterior thereof for controlling the angular setting of said stabilising surfaces and a lever mechanism located externally of each swivel support and co-operating with said control means to effect angular movement of said stabilising surfaces.

7. In a device for damping the rolling motion of ships, stabilising surfaces adapted to be located on both sides of a ship's hull below the water line, a stabiliser shaft in association with each stabilising surface, each of said stabilising surfaces being mounted on its shaft for angular movement relative thereto, lubricated bearing means on each shaft, the hull of a ship having chambers to accommodate each stabilising surface in the inoperative inward position thereof, a swivel support for each stabiliser shaft, each stabiliser shaft being rigidly associated with its swivel support at its inner end, a cylinder and co-operating plunger located in each swivel support, a lever mechanism operatively connected with each plunger and passing through each swivel support to the exterior thereof, means for supplying hydraulic pressure to each cylinder, and a lever mechanism located externally of each swivel support and co-operating with said first lever mechanisms to effect angular movement of the said stabilising surface.

8. In a device for damping the rolling motion of ships, stabilising surfaces adapted to be located on both sides of a ship's hull below the water line, a stabiliser shaft in association with each stabilising surface, each stabilising surface being mounted to be capable of angular movement on its shaft, lubricated bearing means on each shaft, a stabiliser chamber in the ship's hull to accommodate each stabilising surface in the inoperative position thereof, a swivel support for each stabiliser shaft about which the stabilising surface may be swung into and out of its chamber, means for rigidly securing each stabiliser shaft to its swivel support so that the stabilising surface bears against the swivel support, and sealing means for sealing off the said stabilising surface and its swivel support towards the outside.

9. In a device according to claim 8, in which said sealing means comprises a muff of material resistant to oil and sea-water surrounding the adjoining parts of each stabilising surface and its swivel support, and split rings for pressing said sealing means into sealing engagement with grooves in each stabilising surface and in its swivel support.

References Cited in the file of this patent

UNITED STATES PATENTS 1,533,328    Motora _____ Apr. 14, 1925

FOREIGN PATENTS 162,927    Great Britain _____ May 12, 1921
671,699    Germany _____ Feb. 11, 1939